H. C. HARTZELL.
CUTTER HOLDER FOR CUTTER HEADS.
APPLICATION FILED MAR. 27, 1912.

1,039,054.

Patented Sept. 17, 1912.

2 SHEETS—SHEET 1.

Witnesses:
Christ Feinle, Jr.
C. C. Hines

Inventor,
Herbert Hartzell.
By Victor J. Evans,
Attorney.

H. C. HARTZELL.
CUTTER HOLDER FOR CUTTER HEADS.
APPLICATION FILED MAR. 27, 1912.
1,039,054.
Patented Sept. 17, 1912.
2 SHEETS—SHEET 2.
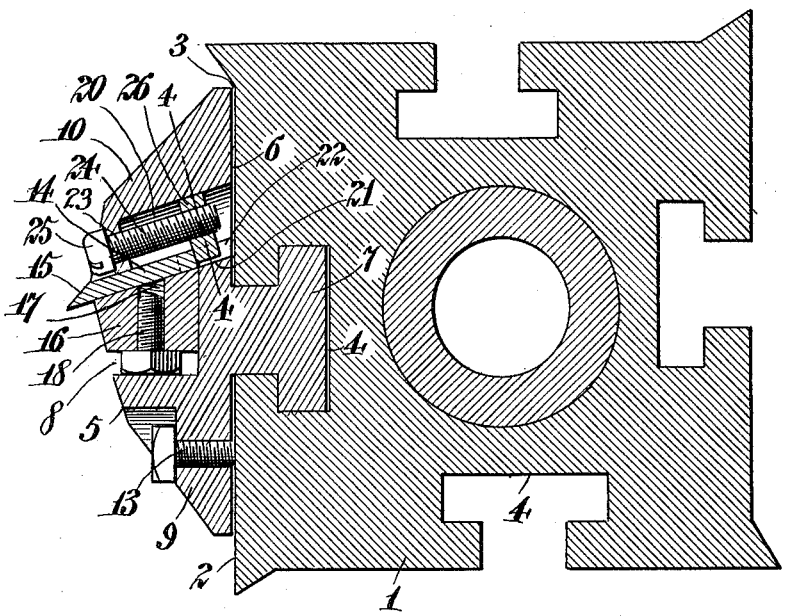
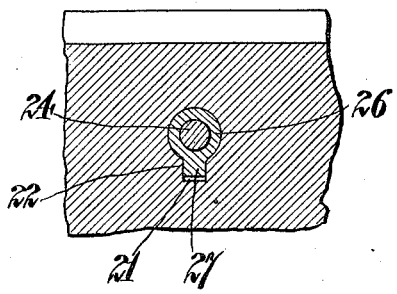
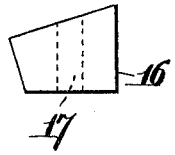
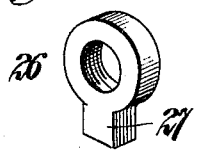
Witnesses:
Christ Feinle, Jr.
C. C. Hines
Inventor,
Herbert Hartzell.
By Victor J. Evans,
Attorney.

UNITED STATES PATENT OFFICE.

HERBERT C. HARTZELL, OF LOS ANGELES, CALIFORNIA.

CUTTER-HOLDER FOR CUTTER-HEADS.

1,039,054.   Specification of Letters Patent.   Patented Sept. 17, 1912.

Application filed March 27, 1912. Serial No. 686,548.

*To all whom it may concern:*

Be it known that I, HERBERT C. HARTZELL, a citizen of the United States, residing at Los Angeles, in the county of Los Angeles and State of California, have invented new and useful Improvements in Cutter-Holders for Cutter-Heads, of which the following is a specification.

This invention relates to rotary cutters for wood working machines, and particularly to rotary cutters for stickers and molders.

One object of the invention is to provide cutter holders or blocks which may be easily and conveniently secured to and detached from the cutter head, enabling different kinds and a varying number of cutters to be employed and interchanged with facility, thus expediting the work of setting the cutter head for doing various kinds of work on a sticker or to perform different kinds of work on a molding machine.

A further object of the invention is to provide a holder which permits of the use of thin hard steel cutting blades, arranged at an obtuse working angle for a scraping cut, thus enabling the cutter to be operated at a faster speed and to perform more work and better work within a given period of time, without liability of slivering hard woods, such as mahogany, birch, etc., that have a curly cross grain, thus overcoming the objections to ordinary cutters working at an oblique angle and operating with a gouging cut.

A still further object of the invention is to provide a holder whereby the blade will be firmly held and may be adjusted as occasion requires, and which will allow molding and surfacing cutters to be employed at will, and obviates the necessity of removing the cutters except when it is necessary to grind or sharpen them.

The invention consists of the features of construction, combination and arrangement of parts, hereinafter fully described and claimed, reference being had to the accompanying drawings, in which:—

Figure 1:
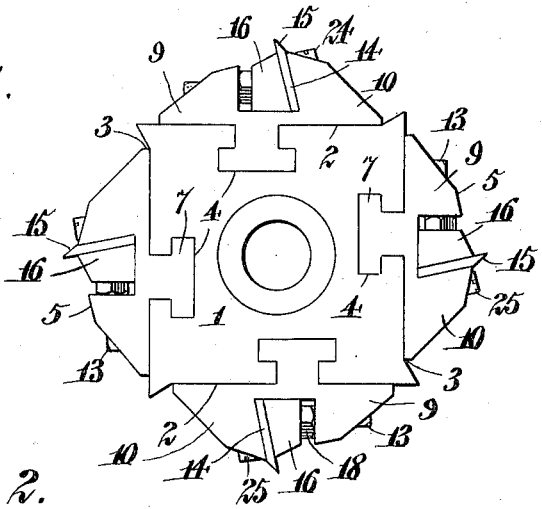
Figure 2:
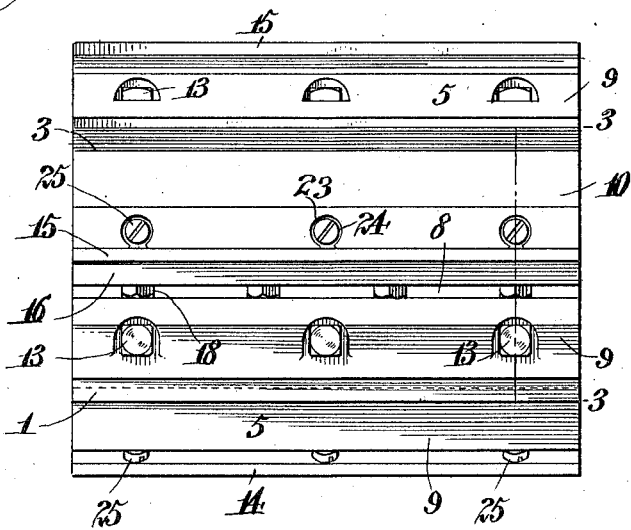
Figure 5:
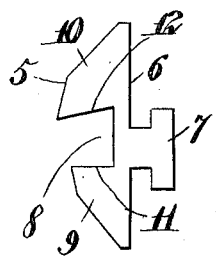

Figure 1 is an end view of a cutter head provided with my improved cutter holders. Fig. 2 is an edge view of the same looking toward one of the cutter holders. Fig. 3 is a vertical transverse section on the line 3—3 of Fig. 2. Fig. 4 is a detail section on the line 4—4 of Fig. 3. Fig. 5 is an end view of the holder or carrier block. Fig. 6 is an end view of the clamping wedge. Fig. 7 is a detail view of the nut used in conjunction with the adjusting screw.

Referring to the drawings, 1 designates a rotary cutter head provided with a series of supporting faces 2 each having at its rear side in the direction of the rotation of the head a shoulder 3, and each of which communicates with a T-shaped receiving slot 4.

In carrying my invention into practice, I provide a cutter holding or carrier block 5 of substantially truncated triangular form in cross section. The base 6 of this block is adapted to rest against one of the faces 2 of the cutter head and to bear at one of its longitudinal edges against the shoulder 3, said block having projecting from its base one or more T-shaped coupling ribs or members 7 to engage the slot 4.

The body of the block is bifurcated by a longitudinal slot 8 opening through its truncated face and opposite ends and forming opposed walls 9 and 10, the wall 9 having a straight face 11 extending at right angles to the plane of the block and the wall 10 having an inclined face 12 extending at an obtuse angle to the plane of the block. The wall 9 constitutes the front wall and the wall 10 the rear wall of the block in the direction of cutting motion.

The block is adapted to be slipped into and out of position by sliding the T-shaped coupling member or members 7 thereof into and out of engagement with the slot 4 and to be clamped in position on the cutter head and against the coacting supporting face 2 by screws 13 passing through the wall 9 and serving to draw the member or members 7 into clamping engagement with the walls of the slot 4. A cutting blade 14, made of thin hard steel is disposed within the slot 8 with its beveled cutting edge 15 projecting beyond the truncated face of the block and its rear side bearing against the inclined face 12 of the wall 10. The front face of the blade bears against the inclined face of a wedge-shaped clamping block 16, which bears at its base against the inner wall of the slot 8, and the opposite or inner face of which is straight and disposed in parallel relation to the face 11 of the wall 9. Formed at intervals in said wedge block are threaded transverse openings 17 receiving screws 18, whose heads 19 are disposed in the space between and bear against the straight front face of the wedge block and the opposing face 11 of the wall 9 of the carrier block.

The wall 10 of the carrier block is provided at intervals with passages 20 extending from a point adjacent its outer face to and through its base and communicating at their inner ends with recesses 21 forming shoulders 22. Screw-threaded openings 23 are formed in the face of the wall 10 and communicate with the passages 20, and through said openings extend adjusting screws 24 having niched heads 25 exposed for their adjustment. Each screw 24 engages at its inner end a nut 26 having a lateral lug 21 projecting into the adjacent recess 27 and bearing against the heel edge of the blade 14, whereby the latter may be adjusted to project its cutting edge 15 to a greater or less degree. The outward movement of this nut is limited by the shoulder 22.

It will be seen from the foregoing description that the cutting blade is clamped in position between the face 12 and adjustable wedge block 16, and is thereby held firmly from displacement, and that by means of the screws 24 said blade may be adjusted for coarse or fine work or to compensate for wear of its cutting edge. It will also be seen that the blade is held at an obtuse angle to the block and working face of the cutter head, so that it will operate with a scraping cut, allowing faster and better work to be performed on hard woods of the character mentioned without liability of slivering the same, such as commonly occurs when oblique-angled cutters of ordinary type operating with a gouging cut are used. Furthermore, it will be understood that the blade is adjustably held in position and requires removal only when its cutting edge is dulled and must be ground or sharpened, so that holders or carrier blocks provided with different sizes or kinds of cutters may be carried at the mill and easily and quickly applied to or removed from the cutter head to vary the number or kinds of cutters as occasion may demand for molding or surfacing, an advantage of material importance in the operation of stickers, where many changes of cutters are required during a working day. The angle at which the blade is held enables blades of thin hard steel to be effectually employed with economy over the use of ordinary steel cutting blades.

Having thus described the invention, what I claim as new is:—

1. In a cutter holder for rotary cutters, the combination of a carrier block having a transverse slot presenting a straight front wall and an inclined rear wall, a cutting blade disposed in said slot and resting against said inclined wall at an obtuse working angle, an adjustable filler between said blade and the straight wall of the slot, and means for adjusting the blade to regulate the extent of projection thereof.

2. In a cutter holder for cutter heads, the combination of a carrier block of substantially truncated triangular form in cross section, said block having a longitudinal slot extending through its ends and truncated face and presenting straight and inclined front and rear walls, the rear wall being provided with passages in rear of its inclined face, a cutting blade disposed in said slot and resting against the inclined face of the rear wall at an obtuse working angle, an adjustable filler block disposed between said blade and the straight wall of the block, adjusting screws projecting into the passages, and members adjustable by said screws to regulate the extent of projection of the blade.

3. In a cutter holder for rotary cutter heads, the combination of a carrier block of substantially truncated triangular form in cross section, said block being provided at its base with one or more T-shaped head-engaging members, and being formed with a longitudinal slot opening through its ends and truncated face and forming straight front and inclined rear walls, the latter-named wall being provided at intervals with passages and recesses intersecting the same, a cutting blade disposed in the slot and bearing against the inclined wall at an obtuse working angle, an adjustable wedge-shaped filler block disposed between said blade and the straight front wall, screws projecting into said passages, and nuts in the passages engaged by the screws and provided with lugs projecting into the recesses and engaging the heel of the blade, whereby said blade may be adjusted to vary its extent of projection.

In testimony whereof I affix my signature in presence of two witnesses.

HERBERT C. HARTZELL.

Witnesses:
 MILDRED I. CHURCH,
 SUSIE P. HARTZELL.